United States Patent [19]

Smirl

[11] 4,436,193
[45] Mar. 13, 1984

[54] VARIABLE PULLEY TRANSMISSION

[75] Inventor: Richard L. Smirl, Arlington Heights, Ill.

[73] Assignee: Borg-Warner Corporation, Chicago, Ill.

[21] Appl. No.: 449,894

[22] Filed: Dec. 15, 1982

Related U.S. Application Data

[62] Division of Ser. No. 257,283, Apr. 24, 1981.

[51] Int. Cl.³ .............................................. F16D 13/68
[52] U.S. Cl. .............................. 192/107 C; 192/113 B; 192/107 M
[58] Field of Search .............. 192/70.12, 70.14, 107 C, 192/113 B, 107 M; 188/264 E, 218 XL

[56] References Cited

U.S. PATENT DOCUMENTS

| | | | |
|---|---|---|---|
| 2,733,798 | 2/1956 | Almen et al. | 192/113 B |
| 2,787,569 | 4/1957 | Smith | 192/107 M |
| 3,073,424 | 1/1963 | Russell | 192/113 B |
| 3,397,761 | 8/1968 | Lindquist | 192/70.14 |
| 4,260,047 | 4/1981 | Nels | 192/70.14 |
| 4,280,608 | 7/1981 | La Buda et al. | 192/113 B |
| 4,280,609 | 7/1981 | Cruise | 192/70.12 |

FOREIGN PATENT DOCUMENTS

| | | | |
|---|---|---|---|
| 215755 | 10/1957 | Australia | 192/70.14 |
| 1455467 | 11/1976 | United Kingdom | 192/113 B |

*Primary Examiner*—Allan D. Herrmann
*Assistant Examiner*—D. Wright
*Attorney, Agent, or Firm*—Florian S. Gregorczyk

[57] ABSTRACT

The present invention deals with a variable pulley transmission assembly operable between a prime mover and a driven means. The assembly includes input and output pulleys each with a movable sheave, where the pulleys are connected by a flexible belt, a fluid-actuated and fluid cooled starting clutch, a forward-reverse-neutral gear arrangement and a differential drive system connected to the driver means. The system also includes a control system to control the fluid actuated clutch and the movable sheaves. The clutch includes a deeply grooved pattern to provide adequate cooling with low pressure oil before its return to sump. This assembly provides a slippable clutch that acts analogously to a fuse under certain conditions to avoid excess loads to the belt means and also to provide lower operating pressure limits on the movable sheave maintaining belt tension. The clutch further provides a low end lugging limit slip to thereby avoid "torsionals" being transmitted past the clutch. The invention likewise provides a continuously variable pulley (CVT) transmission that has a ratio range of 5.4 to 1.

3 Claims, 10 Drawing Figures

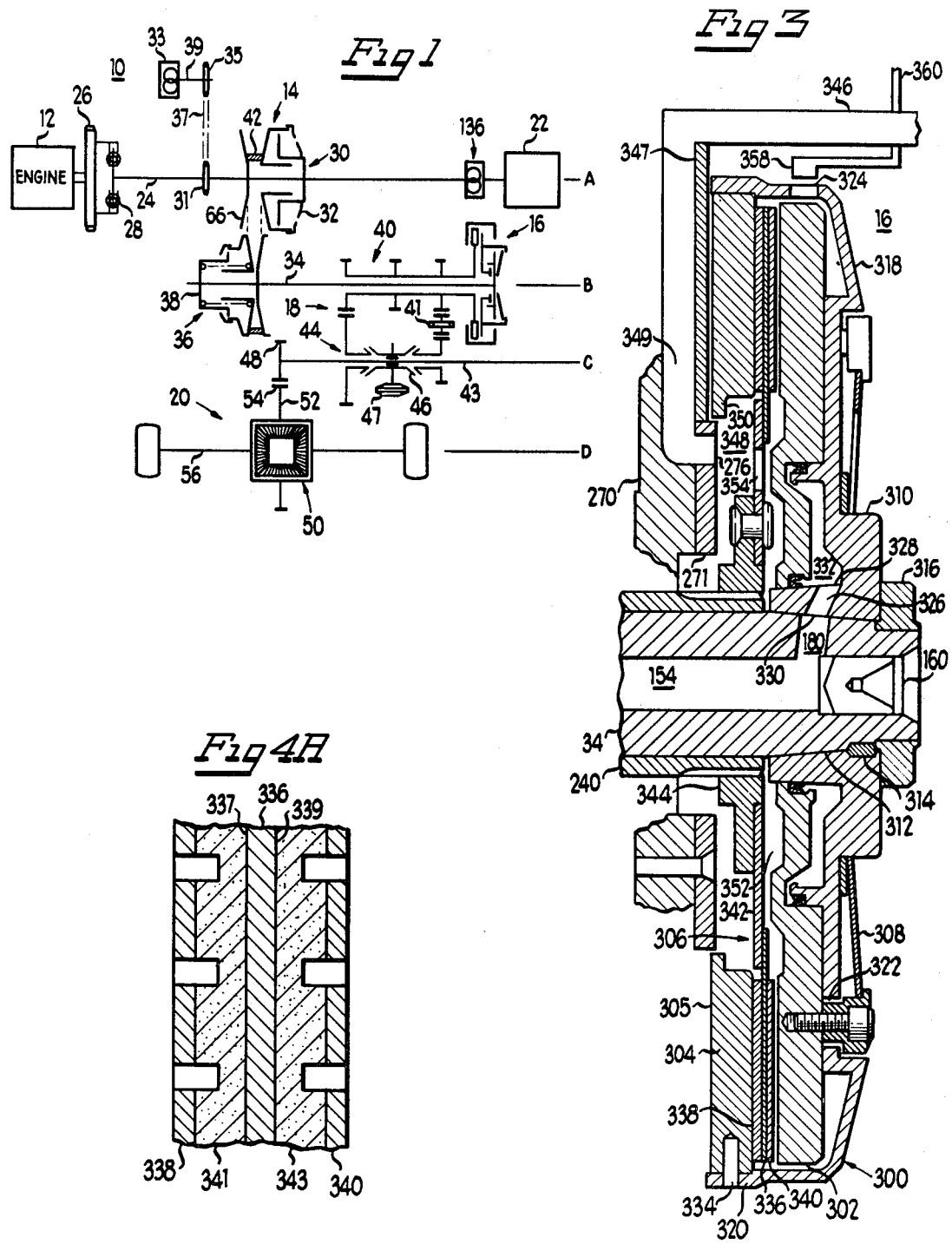

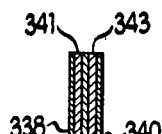
Fig 4
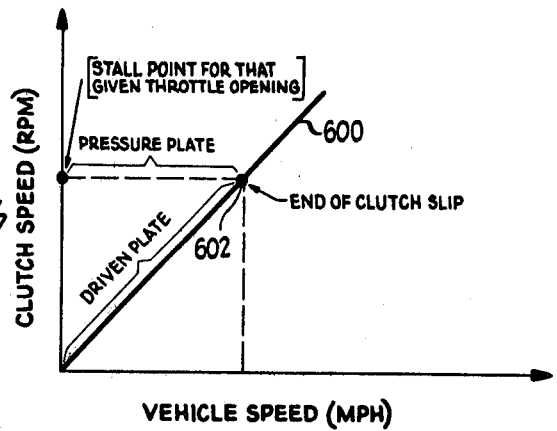
Fig 6
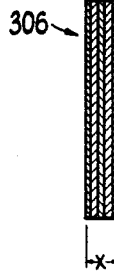
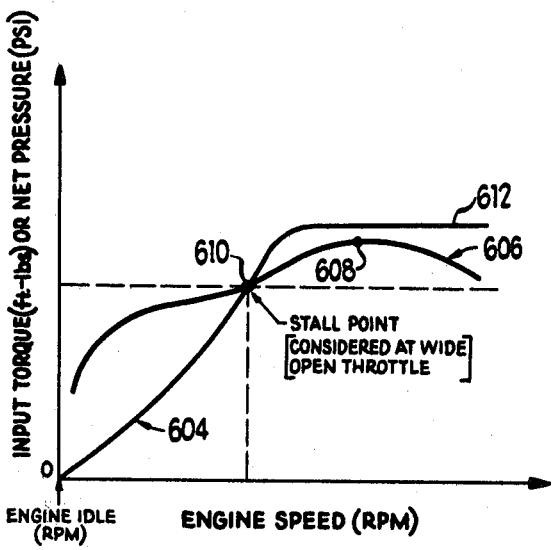
Fig 7
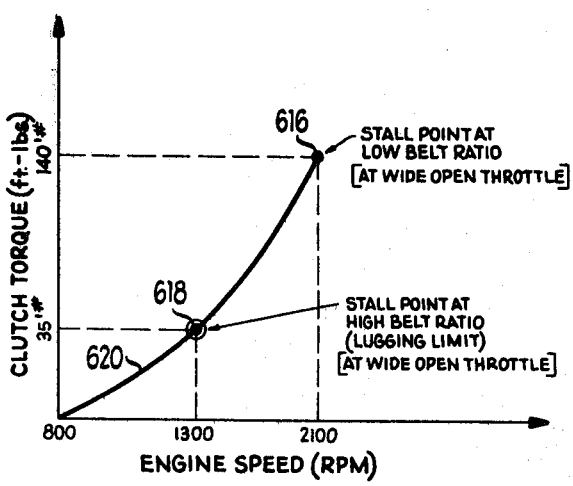
Fig 8

VARIABLE PULLEY TRANSMISSION

This is a division of application Ser. No. 257,283 filed Apr. 24, 1981.

BACKGROUND OF THE INVENTION

Variable pulley transmission assemblies are known in the prior art and are comprised of variable sheave pulleys, a connecting belt means and a control means. In automotive applications it has been necessary to utilize hydrodynamic and/or clutch assemblies as starting devices. This same automotive application requires a means or method to effect a change of direction. It has been found that forward-reverse gear mechanisms having planetary gearing and separate clutches could perform such a task. Planetary gearing also provides a means to attain a desirable gear reduction. Alternatively, a change of direction could be accomplished with a reversal of the pulley rotation. This method of directional change, assuming low belt ratio, requires stopping pulley rotation and initiating motion of the drive train members in an opposite direction. Further, a change of belt ratio when the pulleys are stopped requires that the belt be slid across the pulley faces causing wear on both the belt and the pulley surfaces, and requires a great deal of force to perform such a belt movement.

THE INVENTION

The apparatus according to this invention comprises a variable pulley transmission assembly operable between a prime mover and a driven means. The assembly includes, in order, from the prime mover, a vibration damper, input and output movable sheave pulleys connected by a flexible belt, a belt ratio control arrangement, a wet clutch, a forward-neutral-reverse gear arrangement and connecting elements to a drive means, generally a differential drive system with ring and pinion gear set. This apparatus is adaptable for use with an automobile where the engine is the prime mover and the final drive means is a differential-axle-wheel assembly.

In the invention, a driver variable sheave pulley is mounted on an input drive shaft to which a vibration damper is drivingly connected, and which damper is affixed to a flywheel. A driven variable sheave pulley is mounted on a second shaft and connected to the driver pulley by a flexible belt such that the pulleys are continuously rotating during engine operation. In the preferred embodiment that follows, the driven pulley is sleevably connected to a slippable, fluid actuated starting clutch, generally referred to as a wet or oil-cooled clutch. The starting clutch is responsive to prime mover speed. Also included in this starting device is a forward-neutral-reverse selector mechanism.

This invention provides a continuously variable pulley transmission mechanism (CVT) where the pulleys are in continuous rotation during prime mover operation, which rotation provides ease of belt ratio shift even at a stopped or idle position of the driven means.

This invention also allows belt rotation in a single direction to avoid the necessity of belt direction reversal when the driven means is reversed during forward to reverse shifts, thus the pulley arrangement does not have to be synchronized.

Operative through a spring-released, fluid engaged starting clutch and a forward-reverse mechanism is a final drive means. The axially movable driver pulley flange of the CVT is fluid operated. A change of the distance between the sloped faces of the sheaves of the driver pulley server to vary the ratio of the transmission. The hydraulic piston of the driver pulley cylinder is responsive to a change in fluid volume.

The driven variable-width pulley is comprised of a fixed sheave and a variable sheave. The variable sheave is biased by a coil spring in a fluid holding cavity to a closed or minimum-gap-between the sloped faces of the sheaves direction. The driven variable sheave is fluid operated. The pressure of the fluid being injected through a main fluid line to the driven pulley is at hydraulic pump line pressure diminished solely by pressure drops through a control system, and this same fluid line serves to communicate fluid to operate the slippable starting clutch. The driven pulley has the following characteristics: it is controlled in response to the torque requirement in the driving mode; it is engine speed-responsive in the starting mode; and it is operable by fluid pressure supplied through the main fluid line. The hydraulic fluid line pressure and the bias load of the coil spring control the flange loading of the driven pulley and, therefore, the torque capacity of the pulley and the belt load.

This invention regulates the flange load of the driven pulley to closely match the torque requirements of the belt connecting the driver pulley and the driven pulley, throughout the belt ratio range. Driven pulley flange pressure is the result of the hydraulic fluid pressure and the bias control spring. The same hydraulic fluid pressure is supplied to a wet slipping starting clutch acting against a Belleville zero rate (cf. U.S. Pat. No. 3,951,393) or constant load spring, and the torque supplied to the clutch is always the same as that of the driven pulley. The clutch spring and piston areas are designed and selected to cause the clutch to slip before the belt; in the starting mode, during acceleration through the lower belt ratios, and during steady state top ratio conditions. As a consequence, the clutch is a slippable safety barrier preventing belt slip due to any pressure loss or torque overload under the above stated conditions.

The ratio range of the belt and pulley of the cut is slightly broader than that of similar continuously variable transmissions, that is the invention belt range is about 5.4:1, but the transmission operation requires only a forward-reverse-neutral synchronized gear system. It would likewise be operable with a planetary gear arrangement, or where a fluid coupling is applied as a starting means. An objective of any automotive transmission is to minimize weight and space, and to provide ease of assembly. Implicit in a reduction of weight is a minimization of parts or elements which usually provides greater ease of assembly. The present assembly, as viewed in comparison to that of U.S. Pat. No. 2,150,456 or U.S. Patent application Ser. No. 115,827, filed Jan. 28, 1980, and assigned to Borg-Warner Corporation, is of much simpler design and has fewer parts than those devices.

The transmission assembly of this invention has a CVT assembly with a driver pulley, a driven pulley, and a slippable starting clutch. This CVT and clutch are operable in conjunction with a control means that controls fluid volume to the driver pulley and the fluid pressure to the pressure responsive clutch and driven pulley.

SUMMARY OF THE INVENTION

A transmission mechanism constructed in accordance with the invention comprises an input shaft for receiving drive from a prime mover. Also included is a continuously variable drive system having an input or driver pulley, an output or driven pulley, and a belt extending between the pulleys to transfer power. Each of the input and output pulleys has a fixed sheave and a movable sheave which is operable to vary the distance between the pulley sheaves.

In accordance with one aspect of the invention, a fluid actuated, fluid cooled, slippable, speed-responsive, starting clutch is mounted on a second shaft and is coaxial with the driven or output pulley. A forward-neutral-reverse gear means, hereafter forward-reverse, is mounted along the second shaft and a countershaft. The starting clutch, when engaged, provides a driving connection between the second shaft and the forward-reverse gear means, so that the belt and the pulleys of the CVT continuously rotate in the same direction no matter which direction of drive (forward or reverse) is selected. A control system regulates the fluid volume in one fluid circuit and pressure in a second fluid circuit to thereby effect the sheave gap of the pulleys, and the operation of the slippable starting clutch, and the flange load on the belt.

THE DRAWINGS

FIG. 1 is a diagrammatic view of a variable pulley transmission system in a drive train at a low drive or idle condition;

FIG. 3 is an enlarged showing of the slippable starting clutch;

FIG. 4 is a cross-section view of a clutch disc assembly;

FIG. 4A is a cross-section view similar to that of FIG. 4, but taken on an enlarged scale to show structural details;

FIGS. 6-8 are graphical illustrations useful in understanding the operation.

In the drawings like numbers refer to like elements.

DETAILED DESCRIPTION OF THE DRAWINGS

Figure 2A:
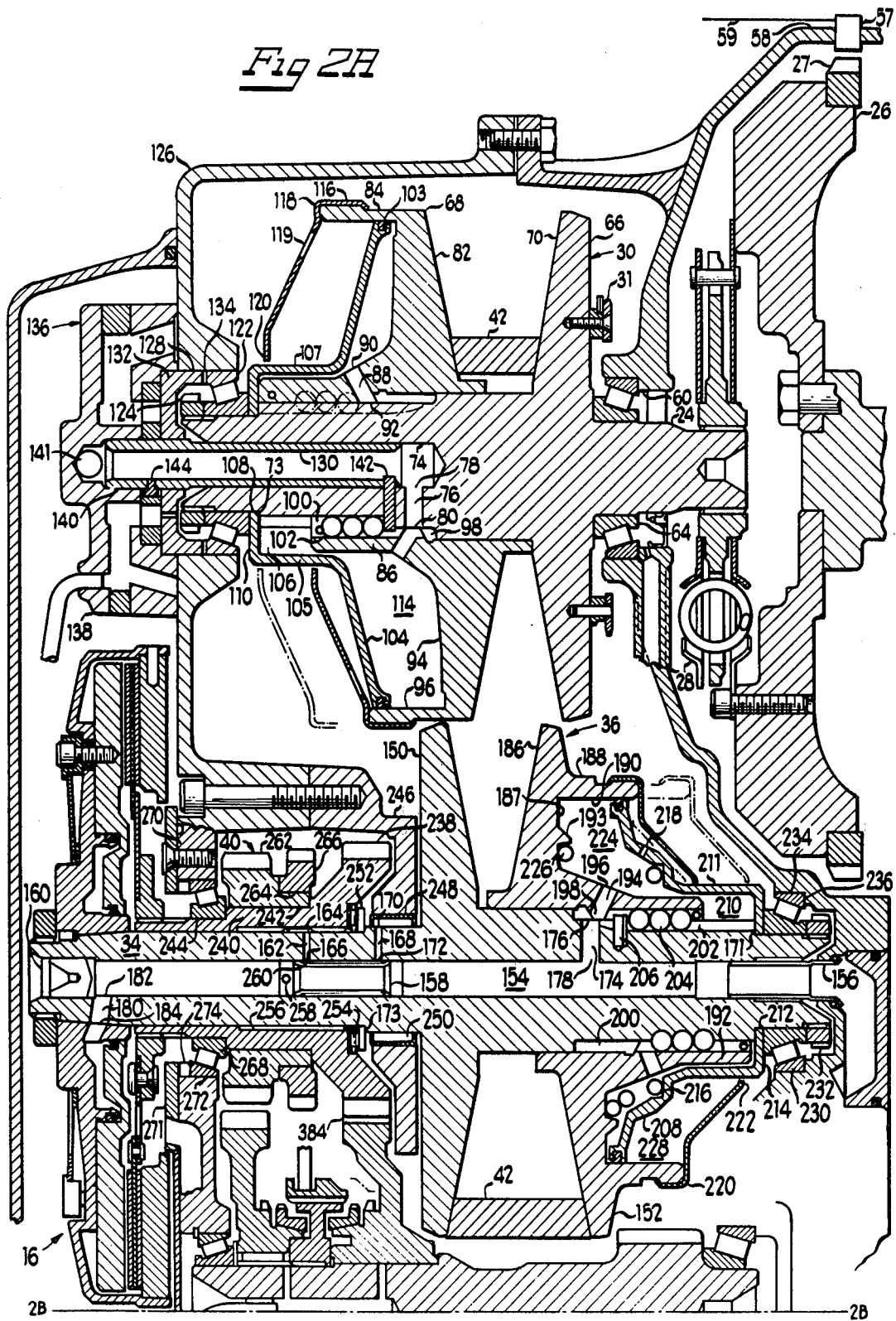
FIG. 2A is a detailed illustration of the transmission assembly along the first two axes of the assembly.

FIG. 1 is a diagrammatic drawing of an assembly of a transmission mechanism 10 in a drive train connected to a prime mover 12, noted as an engine. The assembly 10 has four horizontal and parallel axes lettered A, B, C and D. The assembly includes a continuously variable pulley transmission (CVT) 14, connected between axes A and B, a slippable starting clutch 16 on axis B, a forward-reverse gear means 18 on axes B and C, and a final drive assembly 20 along axis D. A transmission control means 22 is shown along axis A.

The power train elements in FIG. 1 distributed along axis A from the prime mover 12 are a first shaft 24, coaxial with axis A, on which shaft 24 is. A torsional vibration damper 28 is drivingly connected to shaft 24, which damper 28 is affixed to a flywheel 26 connectible to the prime mover 12. Mounted on shaft 24 is an input variable driver pulley assembly 30 which includes a fixed sheave 66 and a movable sheave actuator 32, and the transmission control means 22.

Affixed to and operable with fixed sheave 66 is a sprocket 31. A fluid pump 33, which is illustrated as offset from the axes A through D, has a shaft 39 on which shaft 39 there is affixed a second sprocket 35 which is drivingly connected by a linking means 37 to sprocket 31. Fluid pump 33 is continuously driven by shaft 39 during engine operation to supply fluid at line pressure through conduit means not shown.

Mounted along axis A, between pulley 30 and control means 22, and driven by shaft 24 is a lubricating pump 136.

Coaxial with second axis B is a driven shaft 34. Mounted on the shaft 34 is an output variable driven pulley assembly 36 which includes a movable sheave actuator 38, cluster driver gears 40 of the forward-reverse gear means 18 and the slippable starting clutch 16, which is fluid-actuated and controlled by control means 22. Input pulley 30 and output pulley 36 are connected by a belt means 42.

Axis C is coaxial with a countershaft 43 on which are mounted cluster driven gears 44 of the forward-reverse gear means 18. Driven gears 44 are in continuous engagement with driver gears 40 on shaft 34. Operative between the forward and reverse driven gears 44 and splined on countershaft 43 is a synchronizer 46 which is slidably connected to a gear shift rail 47 to selectively engage either the forward or reverse gear of driven gears 44. Splined to and driven by shaft 43 is a pinion gear 48. A differential assembly 50 of final drive assembly 20 defines a flange 52 on which is mounted a ring gear 54. Ring gear 54 is continuously engaged with pinion gear 48. Mounted and operative between cluster driver gears 40 and driven gears 44 is a reverse idler gear 41, as known in the prior art.

The final drive assembly 20 is coaxially mounted along axis D and includes a drive axle 56. Differential assembly 50 is connected to the drive axle 56 in a manner known in the prior art.

Referring now to FIG. 2A, a vibration damper 28 is shown mounted on shaft 24 and connected to flywheel 26 with gear teeth 27, and this two element combination of vibration damper and flywheel is protectively covered by a housing 58. Mounted in housing 58 above the teeth 27 of flywheel 26 is a magnetostrictive device 57 of a type known in the prior art to produce an electronic signal which is communicated to control means 22 by conductor means 59. This signal is calibratable through control means 22 as a measure of input speed. Housing 58 defines a bore 60. Shaft 24 with a bearing assembly 64 mounted thereon extends through bore 60 to retain bearing 64 therein. Driver pulley assembly 30 is mounted on shaft 24 internal to housing 58 and downstream from bearing 64.

Driver pulley assembly 30 includes a fixed sheave 66 and a movable sheave 68. Fixed sheave 66 defines an inner sloped face 70 and, in cooperation with shaft 24 defines a sleeve 72 with a shoulder 73, a fluid conduit 74 and a passage 76 with ports 78 and 80. Movable sheave 68 defines an inner sloped face 82, an extended arm 84, a sleeve 86, fluid passage 88 with ports 90,92, an inner chamber face 94, and an inner chamber surface 96 of arm 84. Sleeve 86 and sleeve 72 cooperate to define annular fluid chamber 98, and a ball track 100 wherein bearing ball 102 are positioned to thereby ball-spline sleeve 86 about sleeve 72. An annular piston flange 104 with a wall 105 is formed to define a recess 106, a bore 108 and a brace wall 110. The bore 108 and wall 110 are slidably pressed onto shaft 24 against shoulder 73. Recess 106 with a shoulder 107 can receive sleeve 86 and has wall 110 to bear a thrust load. Flange 104 with a lip seal 103 sealingly contacts inner chamber surface 96 of arm 84, and surface 96 cooperates with inner chamber face 94 and sleeve 96 to define a fluid volume chamber 114 which communicates a fluid conduit 74 through ports 78,80,90 and 92, passages 76 and 88 and fluid chamber 98. A flange cap 116 has a wall 118 conforming generally to the shape of piston flange 104 without contacting flange 104. Cap 116 is affixed to arm 84 and is movable with movable sheave 68. Wall 118 defines a bore 120 that is slidable along shoulder 107 of recess 106 but does not bear on shoulder 107.

Wall 118 defines a fluid vent hole 119 to allow fluid linkage to evacuate during pulley 30 rotation from the gap between piston flange 104 and cap flange 116.

An annular bearing assembly 122 is pressed on sleeve 72 against wall 110 and secured in that position by a lock nut 124 affixed to shaft 24, both bearing 122 and lock nut 124 are known in the prior art. A housing 126 defines a bore 128 to receive and retain bearing assembly 122. Housing 126 is secured by means 127 known in the art to housing 58. A tubular insert 130 is positioned in fluid conduit 74 and extends through bearing 122 and lock nut 124 and has mounted about this extended portion a cap 132 having walls 134 pressed into bore 128 to abut bearing 122 without disturbing lock nut 124.

A gerotor pump 136 for lubrication only, such as those manufactured by Nichols Corporation, has a cover 138 defining a recess 140 to receive the tubular insert 130. There is a cross-drilled hole 141 defined by cover 138 that allows communication from an external source to the conduit 74 through tubular insert 130. The pump 136 is affixed to housing 126 by means known in the art. Tubular insert 130 is held by locking pins 142,144 secured to sleeve 72 and pump 136, respectively.

Belt means 42 connects driver pulley assembly 30 with driven pulley assembly 36 which driven pulley 36 is mounted on shaft 34 that is coaxial with axis B. Belt means 42 is known in the prior art.

Pulley assembly 36 has a fixed sheave 150 and a movable sheave 152 which is movable in an axial direction along shaft 34. Shaft 34 defines a through-hole fluid conduit 154 extending longitudinally through shaft 34. This conduit 154 has been reamed at both ends and receives a fluid source connectible insert 156 communicable to a fluid source at one end, and a lubricating insert 158, known in the art, and an end-plug 160 at the opposite end. Shaft 34 defines lubricating passage 162 with ports 164,166 and a second lubricating passage 168 with ports 170,172 which passages and ports communicate with lubricating insert 158. Shaft 34 defines shoulders 171 and 173, a fluid passage 174 with ports 176 and 178 and a second fluid passage 180 with ports 182 and 184, in proximity to clutch 16.

Movable sheave 152 includes an exterior sloped face 186 and an interior wall 187, an extended rim 188 with a contact surface 190, a sleeve 192, and a rib 193 protruding from wall 187. Sleeve 192 defines a fluid passage 194 and communicating ports 196,198 therewith. Sleeve 192 cooperates with shaft 34 to define an annular fluid chamber 200 which communicates between passages 174 and 194; and, sleeve 192 and shaft 34 also cooperate to define a ball track 202 therebetween, in which are positioned bearing balls 204 to thereby ball spline movable sheave 152 to shaft 34. A pin 206 is fitted into shaft 34 extending into track 202 in proximity with passage 174 to serve as a positive stop for bearing balls 204. An annular piston flange 208 with lip seal 209, similar to flange 104 of input pulley 30, is formed about shaft 34. Flange 208 defines a recess 210, a surface 211, a bore 212 and a wall 214. Flange 208 sealingly contacts extended rim 188 along surface 190. Flange 208 defines a shoulder 216, and an orifice 218 of about forty-five thousandths (0.045) inch diameter which orifice 218 can have a "Wiggle Wire" inserted therein to maintain flow but which is not here shown. Affixed to rim 188 at movable sheave 152 is a balance flange cap 220 that is formed in a fashion similar to flange cap 116 at driver pulley 30. Flange cap 220 defines a bore 222 about surface 211 and travels with movable sheave 152 along surface 211 without contacting it.

Movable sheave 152 and piston flange 208 cooperate to define annular fluid chamber 224 that communicates with fluid conduit 154 through passages 174,194 and chamber 198. A coil bias spring 226 is retained in chamber 224 against rib 193 of sheave 152 and shoulder 216 of flange 208. Spring 226 biases movable sheave 152 in the direction of fixed sheave 150. Flange 208 and flange cap 220 cooperate to define a fluid pressure balancing cavity 228 which communicates with chamber 224 through orifice 218. Piston flange wall 214 is secured against shoulder 171 of shaft 34 by a bearing assembly 230 which is secured in position on shaft 34 by a lock nut 232 affixed on shaft 34. Housing 58 defines a bore 234 and shoulder 236 to seat and retain bearing 230, and also defines a recess 235 to enclose lock nut 232.

mounted at the opposite longitudinal end of shaft 34 from bearing 230 is clutch 16. Mounted on shaft 34 between clutch 16 and fixed sheave 150 of pulley assembly 36 are the cluster driver gears 40 of forward-reverse gear means 18. Driver gears 40 include a forward gear 238 which defines a sleeve 240 with lands 242 and 244. Gear 238 is mounted on and rotatable about shaft 34 and is in proximity to but separated from fixed sheave 150 by a support 246 defined by housing 126. Support 246 defines bore 248 in which is seated and retained a bearing assembly 250 mounted on shaft 34 to maintain support 246 concentric about shaft 34. Abutting shoulder 173 of shaft 34 is an annular stop ring 252 against which is mounted a bearing assembly 254. Sleeve 240 is mounted about a bearing 256 positioned on shaft 34 and abuts bearing 254. Shaft 34 defines a fluid entry hole 258 which communicates to the outer diameter of shaft 34. Insert 158 defines a passage 260 which can pick up and communicate a measured volume of fluid. This insert 158 transports lubricant to bearing 250, 254 from bearing 256 through passages 162 and 168, respectively.

Cluster driver gears 40 have a reverse gear 262 affixed to and rotating with land 242 of sleeve 240. Reverse gear 262 defines a shoulder 264 on which is affixed a sprag gear 266 for the parking mode of the transmission assembly 10. Cluster driver gears 40 can also be a single assembly. Mounted on land 244 of sleeve 240 is a retaining bearing 268 which is held in position by a flange 270 defined by housing 126, which flange defines a bore 272 to seat bearing 268 against an annular stop 271 and a spacer 274. Stop 271 is secured to flange 270 by means known in the art.

Clutch assembly 16 is shown in FIG. 3 in an enlarged view and includes a cup-shaped cover plate 300, a pressure or driven plate 302, a reaction plate 304, a clutch disc assembly 306, a Belleville spring 308 and connecting elements. Clutch 16 is mounted on shaft 34 where cover plate 300 defines a hub 310 and a tapered bore 312. Clutch 16 is fitted onto shaft 34, positioned by a dowel pin 314 and secured at hub 310 by a locknut 316, which abuts hub 310 and is screwably affixed to shaft 34. Cover plate 300 defines a front face 318, a perimeter wall 320, a series of connecting-means portals 322 on its front face 318, and a plurality of vent holes 324 equispaced on perimeter wall 320. Hub 310 defines a conduit 326 and ports 328, 330. Cover plate 300 and pressure plate 302 cooperate to define an annular clutch fluid pressure chamber 332 which communicates with conduit 154 through passage 180 and conduit 326.

Reaction plate 304 is affixed to cover plate 300 by a securing means 334 illustrated as a pin or dowel, this reaction plate 304 has a backface 305. Plate 304 can be secured by any means known in the art. Clutch disc assembly 306 includes a clutch disc 336 with large oil grooves for fluid transfer (not shown here), an annular ring 342 and a spline member 344. Clutch disc 336 has surfaces 337 and 338 which have resilient layers 341 and 343 (shown in FIGS. 4 and 4A) affixed thereto and friction facings 338 and 340 respectively mounted thereon. This composite arrangement is positioned between and engageable by pressure plate 302 and reaction plate 304. Disc 336 is drivingly affixed to the outer perimeter of annular ring 342 and this combination is secured to the spline member 344 at the inner diameter of annular ring 342, which spline member 344 is splined to sleeve 240 of forward gear 238.

Clutch 16 is fluid actuated and cooled. Coolant is provided through a fluid conduit 346 connected to a fluid source (not shown in FIG. 3). Plate 304, annular ring 342 and plate 271 define an open cavity 348.

A thin metal annular sheet 347 affixed to plate 271 is in a plane parallel to face 305 of driven plate 304 of clutch 16. Flange 270 and metal plate 347 define a wide passage 349 which communicates with conduit 346. Plate 271 defines a large port 276 which communicates between passage 349 and cavity 348. Reaction plate 304 defines a shoulder 350 to retain the cooling fluid in clutch cavity 348 during rotational motion of the clutch. Clutch disc assembly 306 and pressure plate 302 cooperate to define an irregularly shaped annular cavity 352 in clutch 16 which cavity 352 communicates with vent holes 324 of cover plate 300. Annular ring 342 defines a series of communicating ports 354 to communicate coolant fluid from cavity 348 to cavity 352 and thereafter past both faces of clutch plate 336 and thus to provide coolant fluid emission through vent holes 324 during rotation of the clutch 16.

Pressure plate 302 is connected to zero rate (as explained in U.S. Pat. No. 3,951,393) Belleville spring 308 by connecting means 356 through portals 322, and plate 302 is biased by spring 308 to a disengaged condition as illustrated in FIG. 3. Pressure plate 302 is fluid actuated by fluid pressure in chamber 332 adequate to overcome the force of Belleville spring 308 and to thrust pressure plate 302 in an axial direction into contact with clutch disc assembly 306 and, therethrough, into driving communication with reaction plate 304 through friction faces 338, 340.

Mounted in proximity to vent holes 324 is a magnetostrictive device 358, although any similar transducer signal generator would do, that monitors a magnetic field effect change induced by the change in plate mass as each vent hole 324 passes it. This device 358 is known in the prior art and produces a signal that can be calibrated through control means 22 to indicate pulley 36 output speed.

Figure 2B:
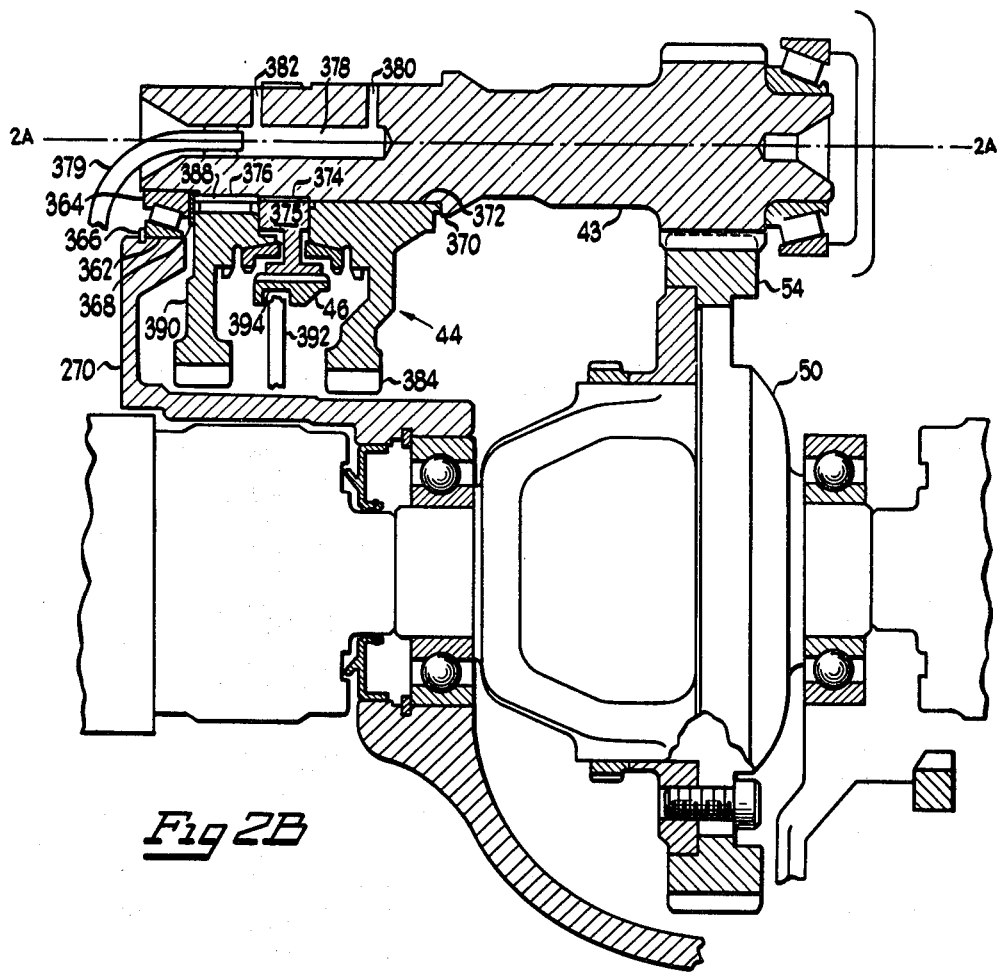
FIG. 2B is a detailed illustration of the transmission assembly along the last two axes.

Referring to FIG. 2B driven gear means 44 of forward-reverse gear means 18 of FIG. 1 includes a forward gear 384 and a reverse gear 390, with bearing means on countershaft 43 which is coaxial with axis C. Flange 270 defines a bore 362 for seating a bearing assembly 364 which is secured in position by a snap ring 366 set in an undercut in flange 270. A thrust plate 268 is mounted on countershaft 43 on the opposite side of bearing assembly 364 from snap ring 366 and these elements are retained on the end of shaft 43 against driven gears 44.

Countershaft 43 defines a thrust shoulder 370, land 372, spline 374 and land 376 each shown with a smaller cross-section on shaft 43 than the previously mentioned cross-section. A toothed ring 375 is splined to shaft 43 at spline 374 and synchronizer 46 is slidably mounted thereon. Shaft 43 also defines a blind-drilled lubricating conduit 378 along its longitudinal axis and, fluid lubricating passages 380 and 382 which communicate between conduit 378 and lands 372 and 376, respectively, at the surface of shaft 43. Lubricating fluid can be communicated to conduit 378 through a conduit means 379 mounted in the end of conduit 378 and connectible to lubricating pump 136, shown in FIG. 2A. Journalled on land 372 of shaft 43 and abutting shoulder 370 is forward gear 384 of driven gears 44. This forward gear is freely rotatable about countershaft 43 and is in continuous engagement with driver forward gear 238 on shaft 34. Pressed on land 376 of shaft 43 is a bearing assembly 388 on which is mounted reverse gear 390 of driven gear means 44. This gear 390 is freely rotatable about countershaft 43 and continuously engaged with reverse idler gear 41 of FIG. 1 of gear means 40 as known in the art. Slidably mounted on toothed ring 375 is synchronizer 46 that defines an annular groove and which synchronizer 46 is slidably engageable with either forward gear 384 or reverse gear 390. Synchronizer 46 also has a neutral position between these forward and reverse gears 384, 390 and is slidable by a gear selection fork 392 positioned in groove 394 defined by synchronizer 46. Synchronizer 46, at engagement with either forward 384 or reverse 390 gears transfers power through countershaft 43 to ring gear 54 mounted on the differential assembly 50 of the final drive assembly 20. Power is transferred to an axle or wheel arrangement as known in the prior art and as illustrated in FIG. 1.

FIGS. 4 and 4A illustrate a part of the laminated clutch disc assembly 306 where the clutch disc 336 is a single narrow annular plate. Disc 336 has opposed surfaces 337 and 339. Affixed to each of these surfaces 337,339 is a resilient material layer, 341 and 343, respectively, such as Armstrong Cork Company's NC-711 material, which is a cork and neoprene composition. Mounted on and affixed to each of these energy-absorbing material layers 341 and 343 is a friction facing material layer 338 and 340, respectively. This laminated clutch structure is generally very narrow in width, that is, on the order of 0.180 to 0.192 inch noted as dimension "x". Each of these resilient layers 341,343 is at least as thick as the thickness of the friction layers 338 and 340, and preferably twice as thick as the friction layers.

Figure 5:
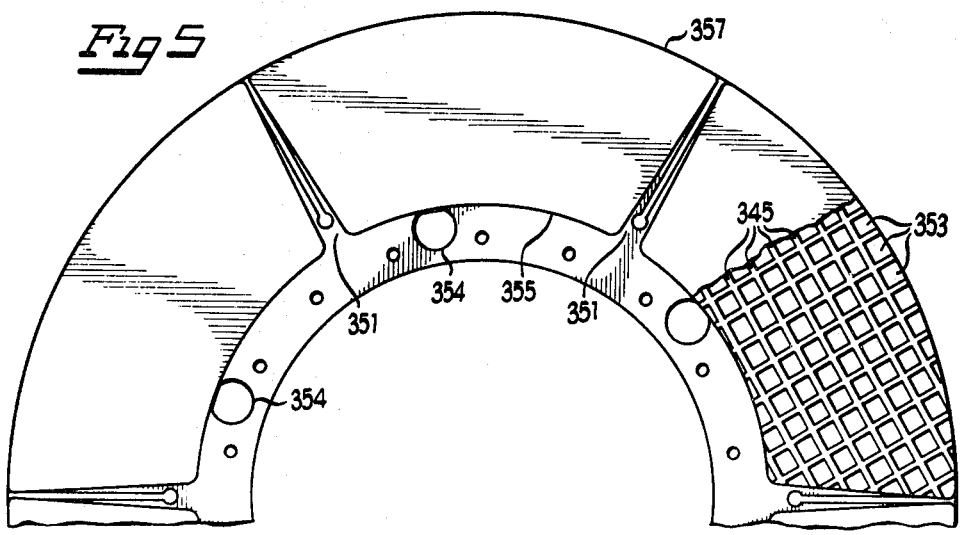
FIG. 5 is a plan view depicting a segment of an annular clutch plate with an oil-groove pattern.

FIG. 5 illustrates a segment of an engaging face of the friction facing material 338 or 340 on the clutch disc assembly. As shown, a pattern of oil grooves 345 is defined on the friction facing layers. The result appears as a waffle pattern, that is, equal surface areas, generally rectangular islands 353 of at least one-twenty fifth square inch in surface area. Clutch disc assembly 306 laminated structure has an inner periphery 355 and an outer periphery 357 and the friction material layers are disposed between these peripheries. Islands 353 are clustered in groups which appear as arcuate segments. These arcuate segments define tapered channels 351 therebetween.

Each channel 351 has a given dimension at inner periphery 355, and the channel tapers, becoming gradually narrower as it extends to outer periphery 357. At the outer periphery, the channel width is reduced to a very small dimension, of the order of one to three hundredths of an inch in the illustrated embodiment. Fluid communication ports 354 are provided in clutch disc 306 providing a passage for cooling oil to inner periphery 355 of the friction material layer. From this location the cooling oil enters the throats of channels 351, which in turn communicate with grooves 345 of friction surface layers 338 and 340. Channels 351 appear as discontinuities in the otherwise continuous cross-hatched or waffle pattern on these friction surfaces.

In accordance with an important aspect of the invention, the depth of grooves 345 is at least twice the thickness of friction layer 338 or 340. This added depth provides a much greater volumetric flow for cooling fluid than is otherwise possible, with a consequent increase in cooling effectiveness. To provide the requisite volumetric flow, grooves 345 extend into the resilient material layer. If the resilient material layer is as thick as the friction material layer, the grooves extend through substantially all of the resilient layer. In a preferred embodiment, the resilient layers are substantially twice as thick as each of the friction material layers. In this case the grooves 345 extend completely through the friction material layer (338 or 340) and through substantially one-half the resilient layer (341 or 343). The coolant fluid flow can be waste fluid from the high pressure control line diverted through the clutch coolant conduit 346 before its return to a sump. This large volume of waste oil is transferred through the extra deep grooves of the clutch friction facing and resilient layers, to provide much more effective cooling than is accomplished with conventional clutch structures. The coolant is transferred to conduit 346 through a large, about three-quarters of an inch deep, ditch at less than one PSI pressure.

OPERATION

Transmission mechanism 10 is responsive to a control system 22 signal. The mechanism 10 provides a slippable starting clutch 16 that is fluid cooled and fluid pressure actuated. The variable pulley system 14 of mechanism 10 is likewise fluid operated. At prime mover 12 start-up, the continuously variable pulley transmission (CVT) 14 is as shown in the upper halves of pulleys 30 and 36 in FIG. 2, that is, where the belt 42 is at its bottom travel or low belt ratio in the driver pulley assembly 14 and the engine flywheel 26 is affixed to prime mover 12 as in FIG. 1. Rotational velocity is transmitted to driver pulley assembly 30 by shaft 24 and thereafter through belt 42 to driven pulley assembly 36. Driven pulley assembly 36 continuously drives shaft 34, which is affixed to fixed pulley sheave 150, and to clutch cover plate 300 at the hub 310 with locknut 316.

Clutch 16 engagement provides a driving connection to synchronized forward-reverse directional gear means 18 from from pulley system 14. The use of gear means 18 obviates the necessity to change belt direction to provide a change of direction to the final drive assembly 20.

Driving power from clutch 16 is provided to the driver gears 40 of forward-reverse gear means 18 through sleeve 240 which is mounted on and rotatable about shaft 34. Forward gear 238 is affixed to sleeve 240 and is continuously engaged to forward gear 384 of the driven gears 44 of gear means 18, which driven gears 44 are mounted on and freely rotatable about countershaft 43. Drivingly mounted on sleeve 240 is a reverse gear 262 of driver gears 40 of gear means 18 which, in conjunction with an idler gear 41, continuously engages reverse gear 390 of driven gears 44 of gear means 18 which is bearing-mounted on countershaft 43 and forms a reverse gear arrangement known in the prior art. Mounted on land 264 of reverse gear 262 on shaft 34 is a parking sprag 266 which is engageable at the stopped or park position, and such gear engagement is well known in the prior art. Synchronizer 46 is splined on ring 375 which is rigidly splined on countershaft 43. The synchronizer is operable by shifting fork 392. The synchronizer 46 is positioned between and slidably engageable with either the forward or reverse gears of driven gears 44. At synchronizer 46 engagement, as drive is being provided through engaged clutch 16, power is transmitted to the final drive assembly 20 in either a forward or reverse direction.

At transmission idle the prime mover 12 is driving input pulley 30 though a flywheel 26, vibration damper 28, and drive shaft 24. As shown in FIG. 2A, upper halves of pulleys 30 and 36 are shown in low belt ratio (i.e., driver pulley 30 at maximum gap opening and belt 42 at closest radius to drive shaft 24). Pulley 30 is utilized to control the belt position or ratio and not belt tension or output torque of the drive train. The change of width between fixed sheave 66 and movable sheave 68 of pulley 30 provides the change in belt ratio in response to the transmission control means 22. This ratio control in the case shown in FIG. 2A, is provided for by an introduction of a fluid to sealed chamber 114, such as from a fluid supply means communicating with fluid passage 74 through insert 130 therein to passage 76, chamber 98 and passage 88. A change in fluid volume into chamber 114 will proportionally move sheave 68 to reduce the sheave gap. As belt 42 travels from the inner radius of pulley 30 to the outer radius, the transmission belt ratio changes from low to high with a range of about 5.4 to 1.

Pump 136 is affixed to shaft 24 and only provides lubricant to the various wearing parts of the transmission at a relatively low pressure, that is in the range of about 20 psi. Control fluid for chamber 114 passes through a counterdrilled hole 141 of pump 136 in the face of cover 138 and thus to fluid passage 74.

Output driven pulley 36 is also fluid operative, however, as driver pulley 30 sheave gap decreases the driven pulley 36 sheave gap increases, and in FIG. 2A this implies that belt 42 would proceed from the outer radius to the inner radius of pulley 36. The sheave gap of the driven pulley 36 is determined by the position of movable sheave 68 of driver pulley 30 through belt 42. Control fluid, at a line pressure controlled by control means 22, is freely communicated to control fluid cavity 224 of driven pulley 36 through insert 156, through-hole conduit 154, passage 174, chamber 200 and passage 194. The piston area of movable sheave 152 within cavity 224 is noticeably smaller than its counterpart of driver pulley 30. Control fluid in cavity 224 is bled to fluid cavity 228 through orifice 218 in piston flange 208. Fluid is transferred to cavity 228 to balance the centrifugal component of the total pressure on either side of flange 208 thereby avoiding a centrifugal thrust on sheave 152. The movable sheave 152 has a bias spring 226 acting on it and biasing the sheave to minimize the sheave gap width.

The through-hole conduit 154 provides a transfer means for control fluid for slippable starting clutch 16, which is engaged through fluid pressure in chamber 332, see FIG. 3. The force of the Belleville spring 308 of clutch 16 tends to maintain pressure plate 302 in the non-contacting or open position. When the fluid pressure in cavity 332 is sufficient to overcome the Belleville spring 308 force, pressure plate 302 is pressed into contact with friction facing 340 to thereafter engage driven plate 304. Coolant fluid is supplied through control means 22 and conduit 346 to cooling fluid cavity chamber 348 of clutch 16. At clutch engagement pressure plate 302 contacts friction facing 340 to drivingly engage driven plate 304. Driving power is thus provided to hollow sleeve 240 of driver gears 40 through disc 336, annular ring 342 and spline member 344. Thereafter, rotational motion is communicated to forward gear 238 and reverse gear 262, which gears are rigidly connected, to each other, and through which shaft 34 extends, and about which shaft 34 forwardreverse gears 238, 262 are freely rotatable. Forward or reverse drive direction, or neutral, if desired, is selectable by operation of synchronizer 46. The synchronizer 46 position is slidably operable by the fork 392 and rail 47, as known in the prior art. The forward, reverse gears 384, 390 on countershaft 43 are in constant engagement with mating forward gear 238, on shaft 340 or idler 41, respectively. At synchronizer 46 engagement rotational motion is transferred to the final drive assembly 20, which assembly includes elements such as a differential 50 and drive axle 56 as known in the prior art.

In the operation of this transmission mechanism the pulley system 14 is in constant unidirectional rotary motion whenever prime mover 12 is operating. All power to the final drive assembly 20 must be communicated from the pulley system 14 through the slippable starting clutch 16, and forward-reverse gear means 18. In this arrangement, the control means 22 controls fluid line pressure in passage 154 and fluid volume in chamber 114 based on engine (input) speed, output speed, throttle (not shown) position and gear shift lever 47 position. The volume of oil in pulley 30 is controlled by means 22 in response to each throttle position to maintain a constant input RPM. For example, during acceleration at one-quarter wide open throttle, means 22 may be programmed to maintain a fixed input RPM, such as 1500 RPM input speed while the belt ratio is being varied from low to high ratio. Conversely, at that throttle opening during a condition of vehicle speed reduction, such as from climbing a grade, the input RPM will be maintained by changing the belt ratio toward low through a discharge of fluid from pulley 30. In the starting mode the control means 22 increases the fluid pressure in clutch 16 as a function of the engine input RPM (for example, as the square of the input RPM). Therefore, at a given throttle opening, a constant torque and a constant RPM will be maintained at clutch pressure plate 302 and the vehicle will accelerate from rest at a constant rate. With the increase in vehicle speed, the RPM of the driven plate increases at a fixed (geared) ratio until it reaches the constant RPM of the clutch pressure plate 302, which defines the endpoint of clutch slip, or the end of the starting mode.

FIG. 6 shows the increase of clutch driven plate speed as a function of vehicle speed on a curve 600. As shown there is a corresponding vehicle speed (in miles per hour or MPH) for each particular driven plate speed (in revolutions per minute or RPM). Curve 600 indicates that vehicle speed and clutch pressure plate speed intersect at a point 602. At that point, the starting clutch is at the end of its slip. From the origin until the end of clutch slip, the angular speed of clutch reaction plate 304 rises proportionally with vehicle speed, and this rise is dependent upon gear ratio, not belt ratio. The pressure or driver plate 302 is rotating at a constant speed (at a given throttle opening).

Also in the starting mode at the first moment before a vehicle has attained a measurable velocity the input torque when plotted as a predetermined function of engine speed can be, for example, a parabolic curve similar to a hydrokinetic device or a centrifugal clutch. In FIG. 7, curve 604 is a parabolic function showing the variation of input clutch torque (in ft.-lbs.) or net pressure (in psi) on clutch pressure plate as a function of engine speed, where the abcissa commences at a value connoting engine idle speed, rather than zero RPM. Also the pressure at engine idle speed is controlled to cancel the opposing force of Belleville spring 308 so the net pressure on the clutch pressure plate is zero at normal engine idle speed, and consequently creep is avoided. Creep is defined as the power transfer through the drive train at stall speed sufficient to overcome rolling resistance. A second general function 606 with a maximum value at point 608 is also shown. This second function 606 represents the net engine torque at wide open throttle as a function of engine speed. The intersection of curves 604 and 606, at point 610, indicates the stall point. This is not a different stall point than that previously noted, but explains the same point utilizing different parameters. The continuation of the parabolic curve 604 above the stall point 610 represents the reserve pressure at the clutch pressure plate. The input torque beyond point 610 is limited to the maximum engine torque 608. The control means 22 accordingly limits the rise in pressure to a predetermined value 612 to provide a controlled reserve pressure slightly above the wide open throttle torque requirement. Correspondingly, a suitable reserve pressure is provided at other torques down to about 25% of the torque at wide open throttle. This minimum value also corresponds to the maximum engine braking torque. This provides a means to protect pulley system 14 from incurring slip and reduces belt 42 loading that would otherwise tend to fatigue the belt.

Clutch 16 is a liquid cooled (wet) starting clutch which is slippable in the starting mode as torque is provided to the final drive assembly 20. At clutch 16 disengagement the fluid pressure in chamber 332 is removed and the Belleville spring 308 acts to retract pressure plate 302 to the disengaged position. This reaction is almost instantaneous, that is, on the order of one-tenth (0.1) second.

Curve 614 in FIG. 8 is generally similar to curve 604 in FIG. 7. Curve 614 will be used, in conjunction with representative values rounded off to whole numbers for ease of comprehension, and these values do not limit the present invention. Curve 614 shows clutch torque plotted as a function of engine speed. In this example, wide open throttle in the starting mode is indicated at stall point 616, correspondng to 2100 RPM and a clutch torque load of 140 ft.-lbs. At this 2100 RPM engine speed, if the belt is at a 1:2 underdrive ratio, at point 616, at this low belt ratio there is effectively a 140 ft.-lbs. clutch torque. However, the clutch torque for a 2:1 overdrive ratio, at this same throttle opening, is effectively 35 ft.-lbs. In this example, the engine RPM for the 35 ft.-lbs. clutch torque on the curve is denoted at point 618, corresponding to 1300 RPM, which becomes the new stall point, and at this high belt ratio of 2:1, point 618 also represents the lugging limit.

In other words lugging below this engine speed is inherently avoided along with the harshness or torsional disturbance associated with lugging at very low speed particularly so with four cycle engines. At vehicle speeds below the lugging limit, the clutch begins to slip and a torsional disturbance associated with such lower speeds will not be transmitted through the clutch. Below the lugging limit engine speed, the control means 22 will again downshift and the engine speed will increase even at a lower vehicle speed to thereby remain above the lugging limit.

In a conventional CVT with a starting device on the input side of the belt stall point is the same in both high and low belt ratios at any given throttle opening, and it is then necessary to add a lock-up device in oder to operate the engine in the more efficient speed range below the stall point and this device still does not provide an inherent lugging limit.

The use of a slippable starting clutch and a forward-reverse gear mechanism provides a compact arrangement of elements to provide power transfer. This mechanism is in lieu of multiple clutch packs or heavier, more complex planetary gear assemblies as shown in the above-cited application, Serial No. 115,827.

Clutch 16 is cooled through cooling paths cut in friction facings 338,340 and resilient layers 341, 343, respectively. This cooling is provided by fluid passing through the waffle pattern on the friction facing. The coolant fluid is waste fluid, such as oil, diverted from a low pressure return line of control means 22. This fluid does not, therefore, require added pump capacity for the high pressure fluid line and as fluid conduit 349 is a relatively large passage, added coolant through the clutch avoids excess back pressure on the control means 22. These large passages permit large volume flows at low pressures thereby obviating high fluid pressures from a pump source and providing greater cooling capacity than is presently known.

In the illustrated embodiment, driven pulley 36 is in a centrifugally balanced condition, that is the centrifugal component of the fluid force on either side of flange 208 is virtually equal, thereby avoiding an imbalance from a centrifugal pressure effect within chamber 224. The clamping force and, therefore, the tension on belt 42 is provided by the fluid pressure in chamber 224 and bias spring 150. This clamping force varies with the fluid pressure controlled only to that pressure required to limit belt creep at a given torque. In the prior art it has been the practice to maintain a large fixed force on the belt 42, regardless of torque input, to thereby avoid belt slip. The prior art overloaded belt, at part engine load, increases belt fatigue and friction losses, and is an added load on the engine or fluid pressure supply system.

In the present invention the attainment of output speed and final gear ratio is through the single paper plate clutch where clutch 16, clutch disc 336 and pressure plate 302 are running at the same speed, having arrived at a locked-up state without a jump or lurch, and without a speed differential at lock-up. Those goals were attained through the use of a forward-reverse gear mechanism in conjunction with a wet clutch while also reducing the number of parts and total weight of the assembly. Such advantages are very important to the automotive industry wherein government regulations require improved fuel efficiency; such an improvement in efficiency is directly proportional to weight losses. In addition, this is the most compact automatic transmission currently available. The economies of reducing the number of parts in any assembly while accomplishing the same task provides cost savings of both material and assembly labor.

The operability of this transmission clearly obviates the use of multiple clutch packs and planetary gear sets. Further the clutch, as disclosed, gives an almost instantaneous disengaging response just by releasing the fluid pressure from the clutch. The use of the combination of elements disclosed gives the user improved cost economies, faster response time, better control, less wear of CVT elements and better fuel economy without a creep condition and without a garage shift thump and also provides better utilization of fluid with reduced output requirements on the fluid pump.

I claim:

1. A fluid cooled clutch including a generally annular laminated clutch disc assembly having an inner and an outer periphery which disc assembly comprises a central disc with opposed surfaces, a resilient material layer affixed to each surface, a friction material layer affixed to each resilient layer where each resilient layer is at least as thick as the friction material layer, and a pattern of grooves is provided in the friction material layer, which grooves extend completely through the friction material layer and through substantially all of the resilient layer, thus providing a path for coolant fluid flow in the laminated structure which is substantially greater than that of a grooved friction layer.

2. A fluid cooled clutch as claimed in claim 1, and further characterized in that a plurality of channels is provided in the friction material layer and resilient material layer of a depth substantially equal to the depth of the grooves, which channels extend from the inner periphery to the outer periphery of the friction material layer, with each channel tapering from a given dimension at said inner periphery to a dimension smaller than the given dimension at the outer periphery, to transfer fluid to the grooves along the radial extent of the disc assembly.

3. A fluid cooled clutch as in claim 1, wherein said grooves define islands of exposed friction material between said grooves, which islands of friction material are substantially at least one-twenty fifth square inch in surface area.

* * * * *